Aug. 12, 1952     H. F. VICKERS     2,606,623
POWER UNIT FOR THREE WHEELED VEHICLES
Filed March 18, 1950

*INVENTOR.*
HARRY F. VICKERS
BY
*Ralph L. Tweedale*
ATTORNEY

Patented Aug. 12, 1952

2,606,623

UNITED STATES PATENT OFFICE 2,606,623

POWER UNIT FOR THREE-WHEELED VEHICLES

Harry F. Vickers, Detroit, Mich., assignor to Vickers Incorporated, Detroit, Mich., a corporation of Michigan Application March 18, 1950, Serial No. 150,502

4 Claims. (Cl. 180—26)

This invention relates to power transmissions and more particularly to the construction of a light riding type of garden tractor and similar power driven vehicles. Light tractors in the range of two to five horsepower are commonly constructed as a two-wheeled power unit with handles similar to plow handles enabling the operator walking behind the tractor to steer and guide the same. More recently, riding types of tractor are finding favorable acceptance. The riding type is inherently somewhat heavier than the walking type and introduces new problems of maneuverability in tight situations. Most tractors having more than about three horsepower are so heavy that it is very difficult to manually pull them backward and, consequently, it has heretofore been found necessary to provide power reverse mechanism. This considerably increases their cost.

It is an object of the present invention to provide an improved riding type of tractor of simple construction which does not require a reversible drive to its traction wheels and which, at the same time, can be maneuvered in a rearward direction under power without the operator leaving his seat. This is particularly useful in such situations as when a plowshare or other implement becomes hooked onto a root or when the tractor has been driven forwardly up against a fence, building, or other obstruction.

Another object is to provide a tractor having a main longitudinal frame on which the operator may ride in straddle fashion together with a self-contained front power and traction unit vertically pivoted on the front of the frame and to so arrange suitable steering levers that the power unit may be swiveled through more than a half circle in order to point the traction wheels in a direction at least partially toward the rear of the vehicle.

Further objects and advantages of the present invention will be apparent from the following description, reference being had to the accompanying drawing wherein a preferred form of the present invention is clearly shown.

Figure 1:
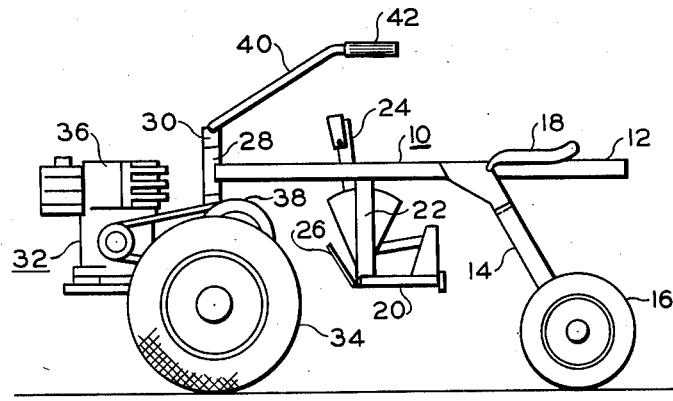
Figure 1 is a side view of a riding tractor incorporating a preferred form of the present invention.

In the form shown in Figure 1, the tractor comprises a main longitudinal frame 10 comprising a horizontal tubular member 12 and a U-shaped yoke 14 carrying trailing wheels 16 at its lower ends. The tube 12 carries a seat 18 and an implement bar 20 secured to a downwardly extending post 22 and controlled by a handle 24. A foot rest 26 is also secured to the post 22. At its front end the frame 10 carries a bearing 28 in which is journaled a vertical column 30 which is rigidly secured to a power and traction unit generally designated 32. This comprises traction wheels 34 and engine 36 and a power transmission 38 for driving the wheels from the engine at one or more reduced speeds. Suitable controls, not shown, for the engine 36 and the power transmission 38 may be provided in the usual manner. The power transmission 38 is of the nonreversing type so that the traction wheels may be driven from the engine in the forward direction only.

Figure 3:
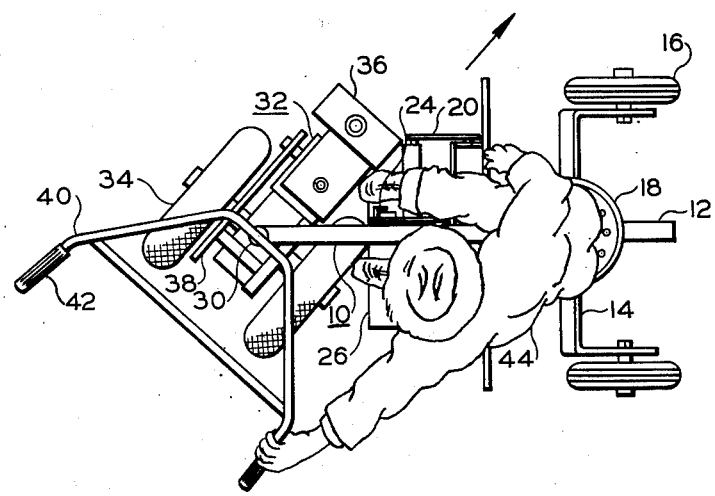
Figure 3 is a view corresponding to Figure 2 showing the parts in a different position.

The frame 10 is elevated above the traction wheels 34 so that adequate clearance is provided to permit rotation of the power unit substantially beyond a direction perpendicular to frame 10. Preferably the clearance is such as to permit rotation of the power unit to a position approximately 135° away from straight-ahead position as shown in Figure 3.

In order to enable the operator to rotate the power unit through this large angle while remaining on the seat, certain relationships between the steering axis, the seat position, and the steering handles are provided. Thus a set of handle bars 40 may be rigidly secured to the upper end of the column 30 and, when viewed from the side as in Figure 1, are inclined upwardly so that the handgrips 42 swing in a horizontal plane substantially above the operator's knees and lap. When viewed from the top as in Figures 2 and 3, the handle bars diverge and the handgrips are set well apart from one another although still within convenient reach of an operator 44 positioned on the seat 18. It has been found that the grips 42 should be located at a radial distance (a) from the center approximating 30 inches or substantially an arm's length. Furthermore, the included angle between the grips 42 measured about the axis of column 30 should be approximately 90° as indicated at (b) in Figure 2. In a preferred construction, which has been found practical and convenient, the radius "a" is 28 inches and included angle "b" is 85°.

The seat 18 should be located so that its approximate center is about 40 inches from the steering axis so that the seat as a whole will be to the rear of, but closely adjacent to, the arc through which the ends of the grips 42 can swing. Thus the steering axis, the handgrip centers, and the seat center are located approximately on the corners of a square as indicated in dot-dash lines in Figure 2. It will be appreciated that the square thus formed need not be exactly true but may depart therefrom by a few inches as may be found most convenient.

Figure 2:
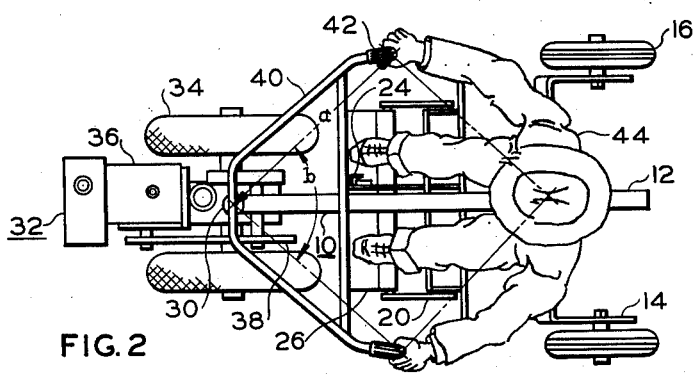
Figure 2 is a top view of the tractor in Figure 1.

In operation the operator takes the position illustrated in Figure 2 holding the handle bars symmetrically as there shown for straight-ahead operation. This gives a natural and comfortable position to the arms for ordinary steering and guiding purposes when the power unit is not turned more than a few degrees. When it is desired to turn the tractor more sharply, for example to the right, the operator lets go of the left-hand grip and swings the right-hand grip across his lap. This action may be continued even further and the right-hand grip transferred to the left hand enabling the power unit to be swung to its extreme position as shown in Figure 3. This may be done either while the tractor is in motion or, if it has come to rest from the plow hooking on a root, or by being stopped just short of a fence or other obstacle, the power unit may be turned to this position with the lower off and the tractor restarted to back the same away from its position of rest. It will be seen that with the power unit positioned as in Figure 3, the resultant direction of motion is in a generally rearward direction, although not, of course, straight back. However, this has been found adequate to clear a plow from an obstacle or to back the tractor away from any large object in front of the same.

While the form of embodiment of the invention as herein disclosed constitutes a preferred form, it is to be understood that other forms might be adopted, all coming within the scope of the claims which follow.

What is claimed is as follows:

1. A light riding tractor comprising a main longitudinal frame carrying a seat and rear wheels arranged to support an operator straddling the frame, a wheeled power unit pivotally mounted about a vertical axis at the front of the frame and comprising a self-contained engine, transmission and fuel supply unit, said self contained unit being located forwardly of the pivotal mounting and having a wheel diameter less than the height of the lowest frame part immediately to the rear of the pivotal mounting, and handle bars rigidly secured to the power unit to rotate the same for steering purposes, the handle bars having grip portions located approximately 90° apart measured about said axis and at a radius approximating 30 inches, the seat being located closely adjacent the arc of swing of the handle bars, the location of the self-contained unit and the relation of the wheel diameter to the frame providing clearance for the power unit to rotate through a total angle substantially greater than 180° whereby the operator while on the seat may swing the power unit into a position to drive the tractor at least partially rearwardly without reversing power wheel rotation by passing one grip portion from the hand normally used therewith to the other hand.

2. A light riding tractor comprising a main longitudinal frame carrying a seat and rear wheels arranged to support an operator straddling the frame, a wheeled power unit pivotally mounted about a vertical axis at the front of the frame and comprising a self-contained engine, transmission and fuel supply unit, said self contained unit being located forwardly of the pivotal mounting and having a wheel diameter less than the height of the lowest frame part immediately to the rear of the pivotal mounting, and handle bars rigidly secured to the power unit to rotate the same for steering purposes, the handle bars having grip portions at their ends, said axis, grip portions and seat being positioned approximately at the corners of a square, the location of the self-contained unit and the relation of the wheel diameter to the frame providing clearance for the power unit to rotate through a total angle substantially greater than 180° whereby the operator while on the seat may swing the power unit into a position to drive the tractor at least partially rearwardly without reversing power wheel rotation by passing one grip portion from the hand normally used therewith to the other hand.

3. A light riding tractor comprising a main longitudinal frame carrying a seat and rear wheels arranged to support an operator straddling the frame, a wheeled power unit pivotally mounted about a vertical axis at the front of the frame and comprising a self-contained engine, transmission and fuel supply unit, said self contained unit being located forwardly of the pivotal mounting and having a wheel diameter less than the height of the lowest frame part immediately to the rear of the pivotal mounting, and handle bars rigidly secured to the power unit to rotate the same for steering purposes, the handle bars having grip portions at their ends, said axis, grip portions and seat being positioned approximately at the corners of a square having sides approximately 30 inches long, the location of the self-contained unit and the relation of the wheel diameter to the frame providing clearance for the power unit to rotate through a total angle substantially greater than 180° whereby the operator while on the seat may swing the power unit into a position to drive the tractor at least partially rearwardly without reversing power wheel rotation by passing one grip portion from the hand normally used therewith to the other hand.

4. A light riding tractor comprising a main frame carrying a seat and rear wheels, a unidirectionally driven, wheeled power unit pivotally mounted at the front of the frame to swing about a vertical steering axis through more than a half circle and comprising a self-contained engine, transmission and fuel supply unit, said self contained unit being located forwardly of the pivotal mounting and having a wheel diameter less than the height of the lowest frame part immediately to the rear of the pivotal mounting, a steering lever rigidly secured to the power unit above the frame and having two grip portions positioned with respect to the steering axis at a radius approximating an arm's length and arcuately spaced by approximately a right angle, said seat being positioned at the rear of and below the arc through which the grip portions may swing whereby an operator while on the seat may swing the power unit into a position to drive the tractor at least partially rearwardly by passing one grip portion across his lap and from the hand normally used therewith to the other hand.

HARRY F. VICKERS.

REFERENCES CITED

The following references are of record in the file of this patent:

UNITED STATES PATENTS

| Number | Name | Date |
|---|---|---|
| 670,179 | Lawson | Mar. 19, 1901 |
| 2,196,347 | Meyenburg | Apr. 9, 1940 |
| 2,443,480 | Schwitzer et al. | June 15, 1948 |
| 2,468,801 | Beall | May 3, 1949 |
| 2,503,106 | Fritz | Apr. 4, 1950 |